United States Patent

[11] 3,631,469

[72] Inventor Ralph Levy
 Leeds, England
[21] Appl. No. 853,002
[22] Filed Aug. 28, 1969
[45] Patented Dec. 28, 1971
[73] Assignee U.S. Philips Corporation
 New York, N.Y.
 Continuation of application Ser. No.
 487,765, Sept. 16, 1965, now abandoned.
 This application Aug. 28, 1969, Ser. No.
 853,002

[54] SYSTEMS FOR COMPARING ELECTRICAL SIGNALS
 4 Claims, 13 Drawing Figs.
[52] U.S. Cl. .................................................. 340/347 AD,
 343/124, 328/146, 340/178, 324/85
[51] Int. Cl. .................................................. H03k 13/02
[50] Field of Search ........................................ 340/347,
 178; 343/124; 328/146, 147; 324/85

[56] References Cited
UNITED STATES PATENTS
3,068,456 12/1962 Nevius.......................... 340/347 X Primary Examiner—Maynard R. Wilbur
Assistant Examiner—Charles D. Miller
Attorney—Frank Trifari ABSTRACT: The present invention features a system for comparing the amplitudes and signs of two simultaneous electrical signals. A chain of discriminators is arranged to determine with successively greater resolution the angle $P = \tan^{-1} X/Y$ where $X$ and $Y$ respectively have the signs and amplitudes of each of the said two signals. In each discriminator except the first in the chain means are provided for inhibiting or correcting errors in the immediately preceding discriminator.

Patented Dec. 28, 1971

INVENTOR
RALPH LEVY
BY
AGENT

INVENTOR.
RALPH LEVY

INVENTOR.
RALPH LEVY

BY

AGENT

INVENTOR.
RALPH LEVY
BY
AGENT

SYSTEMS FOR COMPARING ELECTRICAL SIGNALS

This invention relates to a system for comparing the magnitudes and the signs of two unidirectional electrical signals and for indicating the result of such a comparison. This case is a streamline continuation of application Ser. No. 487,765 filed Sept. 16, 1965 now abandoned.

The invention also relates to an electrical goniometric system arranged to receive electrical signals proportional to sine and cosine functions of an angle to be measured and to resolve and indicate the angle.

One manner of comparing two signals is to apply them respectively to two deflection systems of a cathode-ray oscilloscope. Thus for instance signal could be applied between the x terminals and the other between the y terminals of the oscilloscope so as to add the two signals in quadrature; the angular attitude of the resultant linear trace appearing on the oscilloscope would then be determined by the relative magnitudes and signs of the two signals and the accuracy of such an oscilloscope display can be improved by the addition of further displays arranged to provide angular scale magnification of the original display. A similar manner of resolving an angle from sine and cosine input signals is to apply them respectively to two deflection systems of a cathode-ray oscillator. Thus for instance one signal could be applied between the X terminals and the other between the Y terminals of the oscilloscope; the angular attitude of the resultant linear trace appearing on the oscilloscope would then be determined by the relative magnitudes and signs of the two signals. Such as angle may be considered as extending from a datum line, for instance the positive y direction of a conventional Cartesian graph, and terminating in one of the four quadrants of the graph; the termination of the angle, measured from the datum line, is marked by the trace.

A disadvantage of a cathode-ray tube display system is that the display is of a transient nature; an object of the present invention is to provide an arrangement wherein if desired the information can be expressed in a digital manner so that it can be indicated on a digital display device. Such a display, which may be arranged to continue long after the information producing is has disappeared from the system, is not of a transient nature as is the trace on a cathode-ray tube; further, information expressed in a digital manner can be recorded vary easily and so preserved indefinitely.

The present invention, according to one aspect, provides a system for comparing the amplitudes and signs of two simultaneous electrical signals, wherein a chain of discriminators is arranged to determine with successively greater resolution the angle $P = \tan^{-1} X/Y$ where X and Y respectively have the signs and amplitudes of each of the said two signals, and wherein in each discriminator except the first in the chain means are provided for inhibiting or correcting errors in the immediately preceding discriminator.

According to another aspect of the present invention an electrical goniometric system comprises a chain of angle-measuring discriminators of successively greater resolution, wherein each discriminator is arranged to receive simultaneous electrical signals the magnitudes of which are respectively proportional to the sine and cosine of an angle to be measured by the discriminator, wherein each discriminator is arranged to determine, relative to the datum, the quadrant of a Cartesian representation in which the angle terminates, wherein each discriminator except the first of the chain is arranged to operate with an expansion of four times the angular scale of the immediately preceding discriminator, and wherein each discriminator is arranged to produce in binary digital form output signals indicative of the said quadrant, whereby the angle P to be measured by the system can be indicated by the output signals from all the discriminators in the chain. Each discriminator except the first of the chain may be arranged to operate with an expansion of four times the angular scale of the immediately preceding discriminator; each discriminator is provided with a logic circuit arranged to receive two input signals, to add the said input signals in space quadrature and to produce output indication in binary form indicative of the quadrant of a Cartesian representation in which the resultant addition vector lies.

The invention is readily applicable, for example, to radio direction-finding systems employing two or four aerials or aerial systems arranged at right angles to each other. For example, with four aerials two opposite aerials may produce between them a signal having an amplitude proportional to a sine function and two other opposite aerials would then produce between them a signal having an amplitude proportional to a cosine function; from these two signals the appropriate angle of the incident radio transmission relative to a fixed direction can be determined.

Two embodiments of the invention will now be described with reference to the accompanying diagrammatic drawings wherein.

Figure 1:
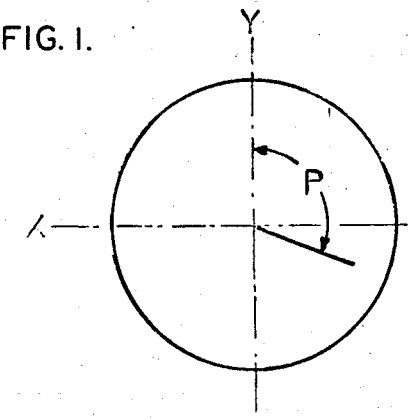
FIG. 1 illustrates a cathode-ray tube display.

Consider two voltages x and y the magnitudes and polarities of which it is wished to compare. If these two voltages were applied to the X and Y terminals of a cathode-ray oscilloscope then a linear trace would be produced as illustrated in FIG. 1 and would represent the vectorial sum of the two voltages when they are added in quadrature. The disposition of this trace in one of the quadrants of the field of display, that is to say of the face of the cathode-ray tube, would indicate in conventional Cartesian form the signs, that is to say the polarities, of the quadrature components x and y; the angular displacement of the trace relative to a datum position, here assumed to be the positive direction of the y axis, would be a function of the relative magnitudes of x and y and could be expressed by $$|x/y| = \tan P \quad (i)$$

where $$x = \sin P \quad (ii)$$

$$\text{and } y = \cos P$$

Now it can be seen that the more accurately the angle P can be determined then the more accurately can the magnitudes of x and y be compared; if therefore we provide an auxiliary cathode-ray tube which reproduces on an expanded angular scale the trace on the first tube then the ratio tan P can be accurately determined.

In the present system the input signal is applied to a chain of discriminators having scale expansion of $1, 4, 16...4^n$, the final number depending on the degree of discrimination required.

Figure 2:
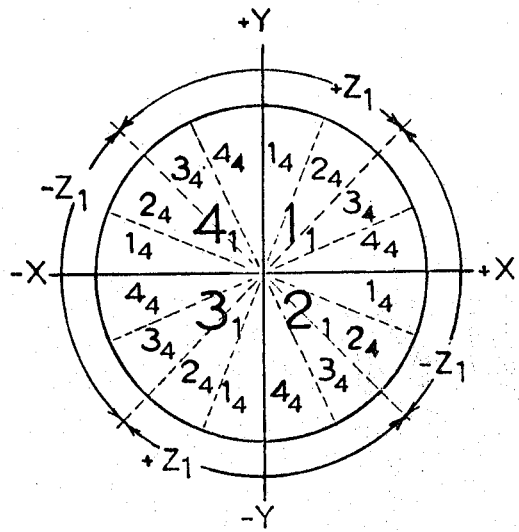
FIGS. 2 and 3 illustrate display patterns appropriate to the first embodiment.
Figure 3:
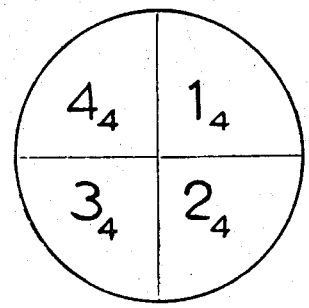
Figure 4:
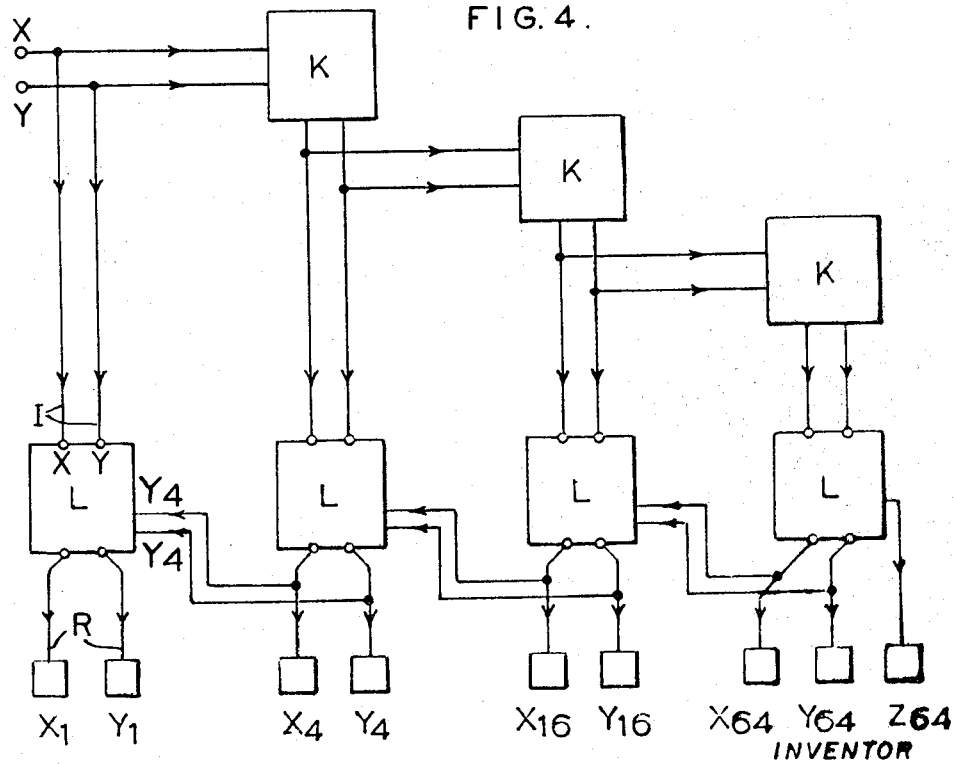
FIG. 4 is a block diagram of the system of the first embodiment.

Referring now to FIGS. 2, 3 and 4 of the drawings, FIG. 2 shows the pattern of a radial display of a $1^x$ expansion discriminator, and FIG. 3 shows a similar pattern for a $4^x$ discriminator; the signals applied to the chain of discriminators can conveniently be considered as derived from the output terminals of an apparatus such as a direction-finding receiver having sine and cosine outputs. The discriminators are arranged so that as the $1^x$ discriminator covers the range 0° to 90° (quadrant $1_1$), the $4^x$ discriminator covers all four quadrants $1_4$, $2_4$, $3_4$ and $4_4$, as indicated in the pattern of FIG. 2. Now if discriminator 1 has a slight error so that a signal which should appear at 89° (quadrant $1_1$) actually appears at 91° (quadrant $2_1$), the signal will appear in quadrant $4_4$ at 356° if the $4^x$ discriminator is accurate. The system will record a signal in quadrants $2_1$ and $4_4$, which represents an error of 90° in discriminator $1^x$, that is one quarter of the total angular range, or if $P$ is proportional to a frequency to be determined one quarter of the total bandwidth.

In this embodiment the system eliminates this gross ambiguity by noting the signs of the difference between $/Y/$ and $/X/$ on all discriminators. The gross ambiguities occur only in regions near the 0°, 90°, 180° and 270° positions, and in these regions $Z = (/Y/ - /X/)$ is unambiguously defined, as indicated in FIG. 2. Hence in the example quoted above, the correct indication of $(/Y/ - /X/)$ is negative irrespective of whether the signal is at 89° or 91° in the $1_x$ discriminator; it follows that the recorded result $2_1 4_4$ must be incorrect since it gives $(/Y_1/-/x_1/)$ as positive. The circuit logic is arranged to change the result to $1_1 4_4$. The acceptable signs are summarized in table I.

TABLE I

| Region | Sector | $X_1$ | $Y_1$ | $X_1 \cdot Y_1$ | $Z_1$ | $X_4$ |
|---|---|---|---|---|---|---|
| 90° | $1_1 4_4$ | + | + | + | − | − |
|  | $2_1 1_4$ | + | − | − | − | + |
| 180° | $2_1 4_4$ | + | − | − | + | − |
|  | $3_1 1_4$ | − | − | + | + | + |
| 270° | $3_1 4_4$ | − | − | + | − | − |
|  | $4_1 1_4$ | − | + | − | − | + |
| 0° | $4_1 4_4$ | − | + | − | + | − |
|  | $1_1 1_4$ | + | + | + | + | + |

From this pattern and, indeed, from inspection of FIG. 2, it is clear that provided the resultant signal lies within one of the regions $(4_4+1_4)$ near the 0°, 90°, 180° and 270° positions not more than one sign will require changing; this leads to the following rules:
1. If $Y_4$ is positive, then
2. $X_1 \cdot Y_1$ should equal $Z_1 \cdot X_4$; if it does not, then
3. If $(/Y_1/-/x_1/)$ is positive charge $X_1$ only,
   and if $(/Y_1/-/X_1/)$ is negative change $Y_1$ only.

It is clear that as soon as the change of sign, if any, has been effected in a discriminator in the chain then the information giving the sign of $Z$ may be ignored and only the signs of $X$ and $Y$ need be actually recorded, except for the last discriminator which is not corrected by one four times more accurate. The signs of $Z$ appear only within the system, having been determined solely in order to resolve the ambiguities. The sign-changing arrangements are described later with reference to FIG. 5.

As the system is based upon the principle of determining the value of $P$ when values of $\cos P$ and $\sin P$, representing two components in quadrature, are given, then the solution obtained can be used to indicate either the value of the angle $P$ or the value of the function $\tan P$, that is to say the ratio of the applied signals $x = \sin P$ and $y = \cos P$.

Thus for example, suppose the angle $P$ is to be determined to an accuracy of 1 part in 256 within the range 0° to 360°, then only nine signs, that is nine binary digits, need be recorded; these nine binary digits comprise two quadrant-locating digits for each of four discriminators plus a digit indicating the sign of $Z_{64}$; $Z_{64}$ is equal to $/y/-/X/$ for the last discriminator.

Such a system is illustrated in block diagram form in FIG. 4 where the $x$ and $y$ signals are applied to a chain of discriminators each of which comprises a logic circuit L and each of which except the first also comprises a scale-expansion circuit K. The details of the scale expander circuit K can be found in S. J. Robinson British Pat. No. 953,430 in particular, FIG. 7 and page 5, line 45 to page 6, line 48.

The $x$ and $y$ signals applied to the input terminals of the logic circuit L of the first discriminator produce at the output terminals thereof a binary indication of the signs of $x$ and $y$, which for convenience may be referred to as $X_1$ and $Y_1$. The $x$ and $y$ signals are also applied to the second discriminator of the chain, the output of the scale-expansion circuit of each of the second and third discriminators being applied to the next in the chain and also to the logic circuit L of the discriminator. Now in each discriminator except the first the scale-expansion circuit is required to expand the angular scale of $P$ so that this angle can be determined more accurately: thus with inputs of the form $x = \sin P$ and $y = \cos P$ it must produce outputs $x_4 = \sin 4P$ and $y_4 = \cos 4P$. Thus if for the purpose of illustration we put $\sqrt{X^2+Y^2}=1$, then in FIG. 4 we may write for the output of the $4^x$ discriminator and input of the $16^x$ discriminator:

$X_4 = \sin 4P \qquad Y_4 = \cos 4P$ and similarly for the output of the $16^x$ discriminator and input of the $64^x$ discriminator $X_{16} = \sin 16P \qquad Y_{16} = \cos 16P$ and so on. In general, where $n$ is the scale expansion factor, $x_n = \sqrt{X^2+Y^2} \sin nP$
$Y_n = \sqrt{X^2+Y^2} \cos nP$ where $P = \tan^{-1}(X/Y)$ Two binary digits appear at the output terminals of each of the four logic circuits L and an extra binary digit giving the sign of $Z_{64}$ appears at an extra output terminal of the last logic circuit thus giving a total of nine binary digits at the output terminals. These output terminals may feed indicators which indicate the signs of $X_1$, $Y_1$, ...$X_{64}$, $Y_{64}$, $Z_{64}$ as shown on FIG. 4. The $x$ and $Y$ indications fed back from next successive logic circuits will be described later with reference to FIG. 5. As the digits at the output terminals of the last logic circuit locate one of four possible divisions within that discriminator then it follows that the angular resolution of the system is 1 part in (64 ×4), that is 1 part in 256.

Figure 5:
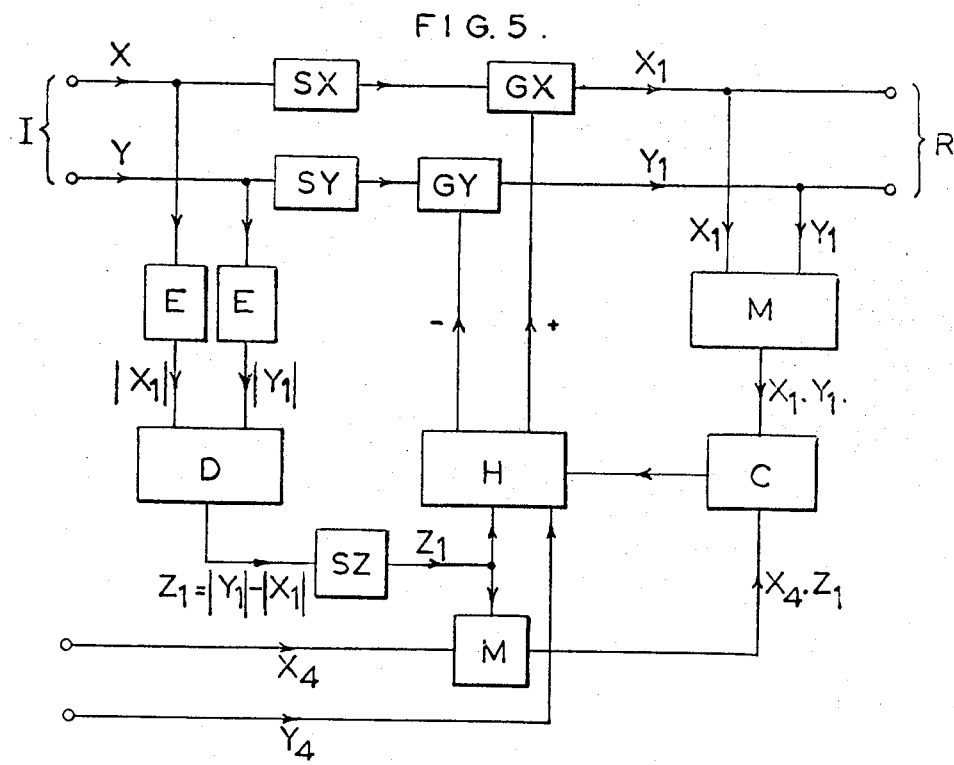
FIG. 5 is a block diagram of a logic circuit for this system.

It should be borne in mind, when considering FIGS. 4 and 5, that the $X$ and $Y$ outputs of each discriminator are in binary form: the magnitudes of the outputs at the recording terminals R, FIG. 5, are always the same but the signs can change. The signals $X_n$, $Y_n$ applied to the inputs of the discriminators can vary in both magnitude and sign.

In order to resolve uncertainties or to correct errors such for instance as would occur when the tangent vector is near to the $x$ or $y$ axis the information of each discriminator is corrected with reference to the four times greater accuracy of a $4^x$ expanded discriminator. It is conceivable that all discriminators except the last one may require correction, and the logic circuitry must be arranged so that the successive changes may take place: some form of storage may be required, but this will be very short term storage, since all the information is immediately available.

A block diagram of a circuit which will automatically perform the logic given by rules (1), (2) and (3) is shown in FIG. 5.

The moduli of the signals $X_1$ and $Y_1$ are formed in stages E and are then subtracted in a difference stage D: the output of stage D is standardized in voltage amplitude in a stage SZ so as to form $Z_1$.

The signals $X_1$ and $Y_1$ appearing at the input terminals I are also each standardized in respective stages S, the signs only being retained, and then pass through stages G which can be controlled to change or not to change these signs as required. The output from the stages G is taken to output terminals R and also to a multiplying stage M at the output of which appears the signal $X_1 \cdot Y_1$.

A second multiplying stage M receives the $Z_1$ output and also an input $X_4$ from the logic circuit of the $4^x$ discriminator and multiplies these two to form $X_4 \cdot Z_1$. The two products $X_1 \cdot Y_1$ and $X_4 \cdot Z_1$ are compared in a sign comparator stage C and if these two products are not of the same sign, as required by rule (2), then the output from the stage C operates a sign-splitter stage H and allows the output $Z_1$ from stage SZ to operate the sign changer GX if $Z_1$ is positive or to operate the sign change GY if $Z_1$ is negative, so satisfying the requirements of rule (3). The sign-splitter stage H includes a control gate which only allows the stage to operate if the $YY_4$ signal applied to the stage is positive; this gate is included so as to satisfy the requirements of rule (1). The corrected signals $X_1$ and $Y_1$ are then recorded.

All the circuit elements in FIG. 5 are simple switches, and hence have very large dynamic range, except for the difference stage D. This is required only to decide whether $/Y_1/$ or $/X_1/$ is the larger, and hence in this stage, which preferably includes an amplifier, considerable compression may be incorporated to achieve a large dynamic range.

The advantage of the system is accuracy to any desired power of 4, good dynamic range and considerable simplicity, especially when compared with systems previously proposed.

In the arrangement illustrated in FIG. 4 each of the $16^x$ and $64^x$ discriminators derives its input from the preceding discriminator in the chain; with this arrangement each of the three $4^x$, $16^x$ and $64^x$ discriminators expands the scale of its input signal by a factor of 4. In a modified form of this arrangement all the discriminators are fed in parallel from the $X$ and $Y$ terminals, the third discriminator is arranged to have a scale expansion of $4^2=16$ and the fourth and last discriminator is arranged to have a scale expansion of $4^3=64$; in general each discriminator thus operates with a scale expansion of $4^q$ where $q$ is the number of preceding discriminators in the chain.

Figure 6:
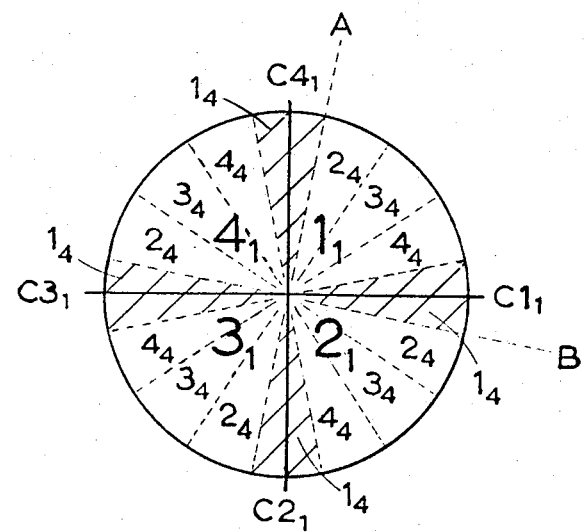
FIG. 6 illustrates the second embodiment.

A second embodiment again contains discriminators of expansion ratios $1^x$, $4^x$, $16^x$, etc. but the discriminators are "staggered" so that the 90° or cardinal points of discriminator 1 occur at the center, or 45° positions of quadrant 1 of discriminator 4, as illustrated in the pattern diagram of FIG. 6. If it can be guaranteed that the nonlinearities in the two discriminators are such that quadrant $1_4$ of discriminator 4 encloses the cardinal points, that is to say the $x$ and $y$ axis boundaries, of discriminator 1 as illustrated by the shading in FIG. 6, then a gross quadrantal error in the digits from discriminator 1 is only possible when the signal falls in quadrant $1_4$. Suppose that digits are set up to represent the cardinal positions $C1_1$, $C2_1$, $C3_1$ and $C4_1$, and further that the digits representing $C1_1$ are the same as $1_1$, $C2_1$ the same as $2_1$, etc. It is clear that when the signal is at a frequency close to a cardinal direction of discriminator 1, then though the quadrant digits may be in error there will be no error in the cardinal-point digits. The appearance of digits representing $1_4$ may therefore be used to reject the quadrant digits of discriminator 1 and accept the cardinal-point digits instead. For all other quadrants of discriminator 4, i.e., $2_4$, $3_4$ and $4_4$, the quadrant digits of discriminator 1 are selected. Thus the digits representing $C1_1$ or $1_1$ indicate the quadrant AB of discriminator 1 without possible error.

The quadrants are established by the signs of $X$ and $Y$, and the cardinal points by the signs of $(X-Y)$ and $(/X/-/Y/)$, as shown in table II.

TABLE II

| Quadrant | X | Y | Cardinal Point | X-Y | /X/-/Y/ |
|---|---|---|---|---|---|
| $1_1$ | + | + | $C1_1$ | + | + |
| $2_1$ | + | − | $C2_1$ | + | − |
| $3_1$ | − | − | $C3_1$ | − | + ) |
| Change | | | | | ) ( to ( |
| $4_1$ | − | + | $C4_1$ | − | − ) + |

As indicated in table II, the condition in which the sign $(X-Y)$ is negative is used to reverse the sign of $(/X/-/Y/)$, circuit techniques similar to those used in FIG. 5 being employed. The signs of $X$ and $Y$ may then be used as the quadrant digits, and the signs of $(x-Y)$ and $(/X/-/Y/)$ as the cardinal-point digits. The condition that the digits of $1_1$ must be the same as those of $C1_1$ and so on, is then fulfilled, because at the cardinal points the sign of $X$ is the same as the sign of $(X-y)$ and the sign of $(/X/-/Y/)$ is the same as the sign of $Y$.

The accuracy of this second embodiment is similar to that of the first embodiment, that is to say one quadrant of the final discriminator, but a higher degree of linearity is required from each discriminator in order to achieve this accuracy. As it might be difficult to achieve this higher degree of linearity in a practical discriminator the first embodiment would probably be preferred; the advantage of the second embodiment is that multiple sign corrections are avoided by the "staggering" of the discriminators.

Figure 7:
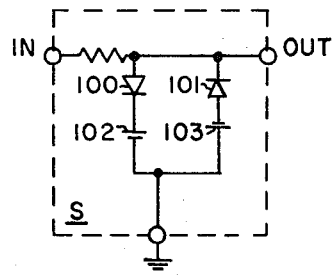
FIG. 7 is a schematic diagram of the normalization circuits labeled with the prefix S in FIG. 5.

FIG. 7 shows a circuit for standardizing (i.e., normalizing) an input voltage. Two diodes 100, 101 are reversed biased by the voltage sources or batteries 102, 103 respectively. Therefore, when the absolute value of the input voltage exceeds a particular value, one of the diodes 102, 103 will conduct and "clip" the applied voltage, preventing the output voltage from exceeding this absolute value.

Figure 8:
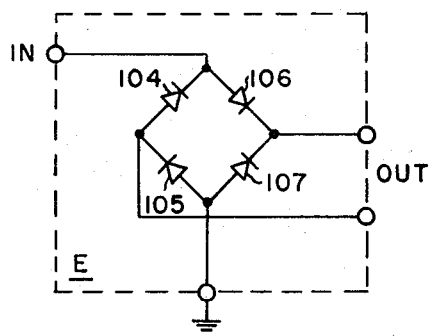
FIG. 8 is a schematic diagram of the absolute magnitude stages labeled E in FIG. 5.

FIG. 8 shows the absolute magnitude indicator E which comprises four diodes 104, 105, 106, 107, arranged in a full wave bridge configuration. Thus, no matter what the polarity of the input voltage, the output will always be of a selected polarity.

Figure 9:
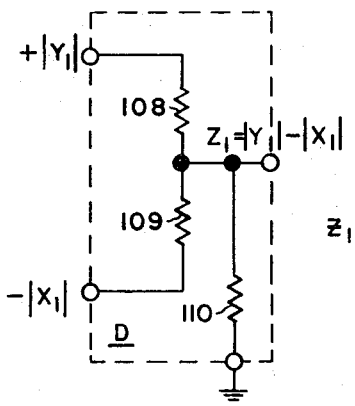
FIG. 9 is a schematic diagram of the difference stage labeled D in FIG. 5.

FIG. 9 shows the difference circuit D which comprises two decoupling resistors 108, 109 and a load resistor 110. Since the $Y_1$ input is positive while the $X_1$ input is negative, the output will be $Y_1-X_1$.

Figure 10:
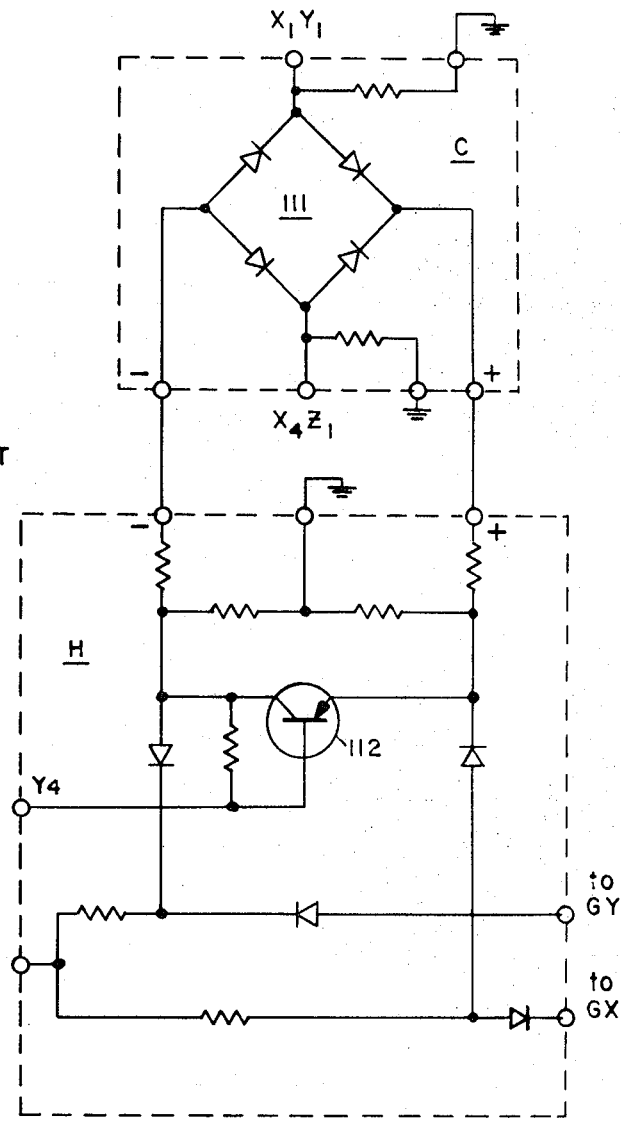
FIG. 10 is a schematic diagram of the comparator and sign splitter stages labeled C and H in FIG. 5.

FIG. 10 shows the comparator and sign splitter stages C and H. The comparator stage comprises a full-wave rectifier 111, while the sign splitter stage features a transistor 112 serving as a $Y_4$ input gate.

Figure 11:
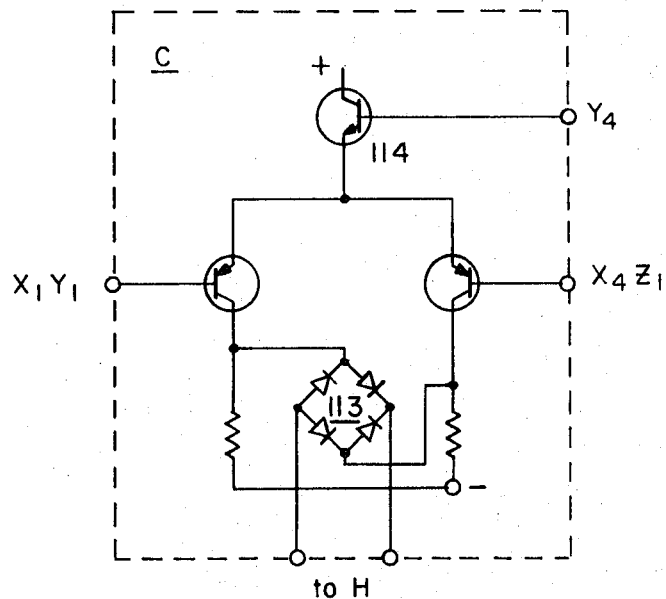
FIG. 11 is a schematic diagram of an alternative embodiment of the comparator stage C.

FIG. 11 shows an alternative embodiment of the comparator stage featuring a full-wave rectifier 113 and wherein the $Y_4$ gate 114 is positioned within the comparator rather than in the signal splitter stage.

Figure 12:
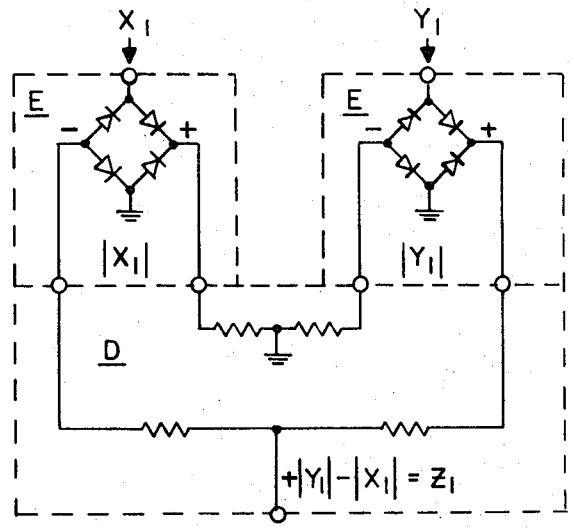
FIG. 12 is a schematic diagram showing the interconnection of the E and D stages.

FIG. 12 shows the interconnection of absolute magnitude and difference stages. Note that the output polarities of the E stages are opposed in the D stage so that the difference and not the sum is computed.

Figure 13:
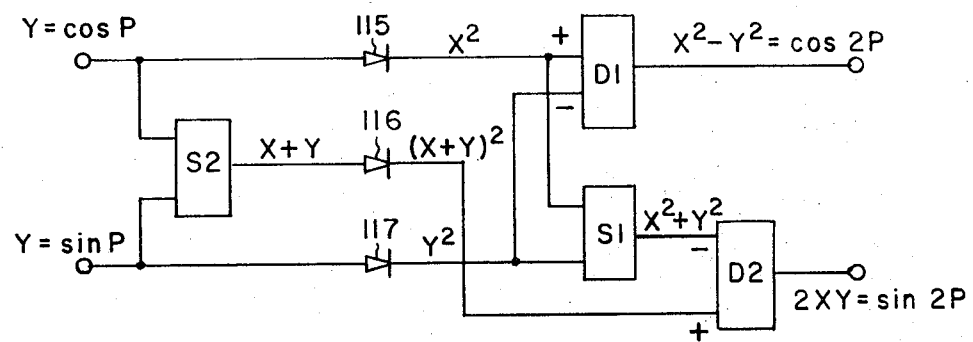
FIG. 13 is a schematic diagram of a portion of the scale expander circuit labeled K in FIG. 5.

FIG. 13 shows the details of the scale expander circuit K of FIG. 4. It comprises sum and difference computers S1, S2, D1, D2; and square law rectifiers 115, 116, and 117. The sum and difference computers can be as shown before or can be pulse transformers having two primaries and one secondary. For the sum circuit the primary windings of each transformer are wound in the same direction; for the difference circuit in opposing directions. The scale expander has two inputs $X = \cos P$ and $Y = \sin P$. Since the square law rectifiers and the sum and difference computers perform their named function, the voltages at various points in the circuit will be as indicated because of the following trigonometric identities:

$X^2-Y^2 = \cos^2 P - \sin^2 P = \cos 2P$ $2XY = 2 \cos P \sin P = \sin 2P$ of the circuit represent trigonometric functions of twice the angle $P$. To get a voltage representing four times the angle $P$, two of the above stages are cascaded.

Although, for convenience, the invention has been described in embodiments suitable for use with a direction-finding system, it will be understood that the invention is not limited to such an application but can be readily adapted for any system where an angle is to be determined from two signals one of which is proportional to the sine of the angle and the other of which is proportional to the cosine of the angle.

I claim:

1. A system for comparing the amplitude and polarities of two simultaneous pulsed wide range direct current electrical signals representing the sine and cosine components of an angle to be measured comprising; first discriminator means for producing a first digital output quantity having a value determined by the magnitude and polarity of said input signals and indicating to a first approximation the angle to be measured, electrical scale expansion means coupled to receive said input signals for producing angular scale expansion of the angle said signals represent, second discriminator means coupled to said scale expansion means for producing a second digital output quantity indicating to a second approximation the angle to be measured; and correction means receiving continuously the entire second output for parallel correction of any errors in said first output whereby the angle to be measured is computed with greater accuracy.

2. A system as claimed in claim 1 wherein said scale expansion means expands the scale of said second discriminator to four times that of said preceding first discriminator, whereby the output quantities represent successive Cartesian quadrants of the angle to be measured.

3. A system as claimed in claim 2 further comprising means for producing the four quadrants of the output of the second discriminator wholly within one quadrant of the first discriminator.

4. A system as claim 2 further comprising means for producing the boundaries between adjacent quadrants in the first discriminator wholly contained within one particular quadrant of the second discriminator whereby the second discriminator generates output signals to indicate said boundaries.

* * * * *